(No Model.)

L. PAGET.
PROCESS OF PREPARING ELECTRODES FOR SECONDARY BATTERIES.

No. 397,607. Patented Feb. 12, 1889.

Witnesses:
Geo. W. Breck.
Carrie E. Ashley.

Inventor,
Leonard Paget
By his Attorneys
Wiedersheim & Kintner

UNITED STATES PATENT OFFICE.

LEONARD PAGET, OF NEW YORK, N. Y., ASSIGNOR TO THE MACRAEON STORAGE BATTERY COMPANY, OF SAME PLACE.

PROCESS OF PREPARING ELECTRODES FOR SECONDARY BATTERIES.

SPECIFICATION forming part of Letters Patent No. 397,607, dated February 12, 1889.

Application filed October 23, 1888. Serial No. 288,908. (No model.)

*To all whom it may concern:*

Be it known that I, LEONARD PAGET, a citizen of the United States, residing at New York, county of New York, and State of New York, have made a new and useful invention in Secondary or Storage Batteries, of which the following is a specification.

My invention relates particularly to an improvement in the process of preparing electrodes for use in secondary or storage batteries; and its object is to devise a simple, more expeditious, and cheaper method of constructing the electrodes of that type of secondary or storage batteries in which the active material, or material adapted to become active, is sustained or supported by grids, frames, or analogous retaining devices. To this end it consists in the method of procedure hereinafter described, and particularly pointed out in the claims which follow this specification.

Figure 1:
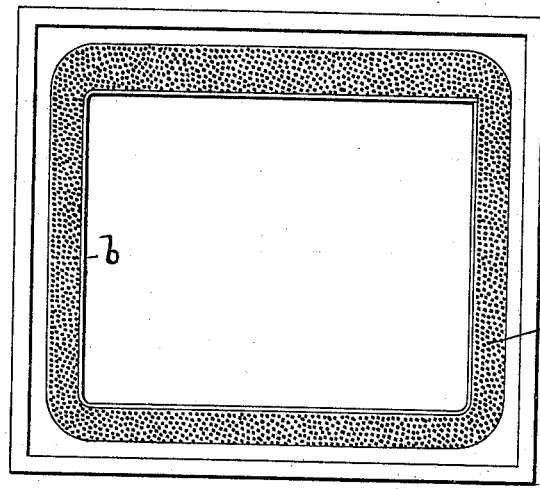
Figure 2:
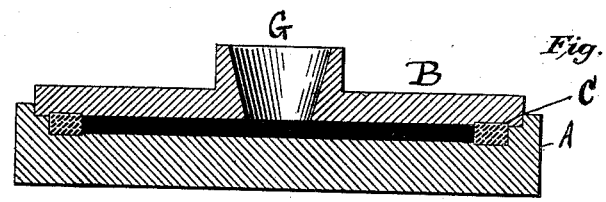
Figure 3:
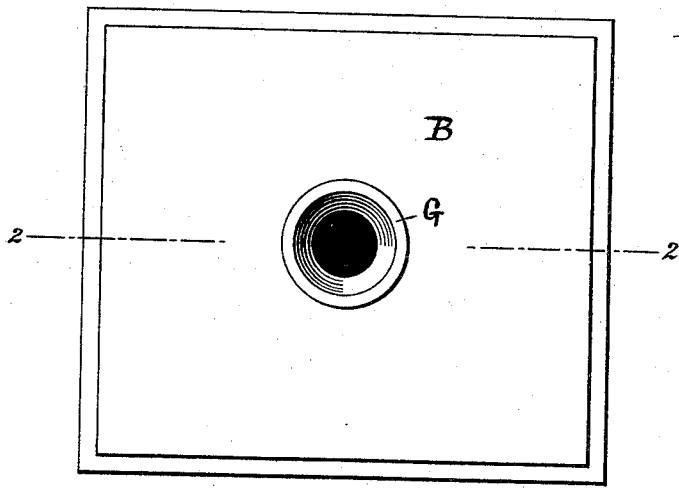

Referring to the drawings which accompany this specification, Figure 1 is a plan view of the interior of a mold for casting an electrode in accordance with my improved process, hereinafter described. Fig. 2 is a cross-sectional view on line 2 2, Fig. 3, which latter is a plan view of the mold with the lid in place.

Prior to my invention it was old in the art to construct electrodes of the type referred to by first casting grids, frames, or supports of any desired form or shape best calculated to securely hold the active material, or material adapted to become active, in place, and to then pack this material in the opposite faces of the grids, or hold it therein in any desired manner, there being many forms of electrodes in which the invention is directed particularly to the special feature of improved retaining devices. It was also old to weld the active material, or material adapted to become active, to the grid plate or support, and to cast the support around a previously-shaped mass of hardened paste-like active material.

In a prior application filed by me in the United States Patent Office on the 8th day of August, 1888, bearing Serial No. 282,272, I have disclosed and claimed a process of uniting the active material, or material adapted to become active, to the electrode or support by fusing it and then immersing the plate or support in the molten mass and allowing the whole to cool, the cooled mass constituting a completed electrode ready for use. This process involved more or less expense, in that two steps were necessitated to complete the electrode.

It is the especial object of the present invention to simplify said process and reduce the operation to a single step, whereby both the active material, or material adapted to become active, and the support, grid, or retaining-frame are all produced during one and the same operation, thereby creating an electrode which is cheaper, lighter, more durable, and more efficient.

In the use of that type of electrodes in which the active material is mechanically applied to the retaining plate or grid or held thereon by extraneous devices there results, necessarily, during the process of charging, a generation of gases between the support and the active material, and it is largely due to this cause that the plates buckle and the active material falls out of place. In other words, there is not sufficient integrality between the active material, or material adapted to become active, and its support to prevent this gas formation.

The second type, which I have referred to above, in a measure overcomes the objections urged; but there does not result with it such perfection of action as is obtained with my improved electrode, for the reason that there is not nor cannot be such integrality between the two parts—viz., the active material and its support—as to avoid this generation of gases. This fact will be clearly understood when one is made acquainted with the fact that there cannot be an absolute integrality between the salt of a metal and an additional metal itself where there is anything short of the fusion of both, and this for the reason that the salts of any metal—as lead oxide—fuse at a much higher temperature than the metallic lead itself; consequently when the molten lead is cast around a paste of the lead oxide it merely sets on the surface of the oxide and makes a purely mechanical connection, and in no sense entering the surface of or integral with the lead oxide. When, however, the oxide of lead or lead salts is fused and then cast upon the metallic or molten base or supporting-plate, as described in my prior application, its higher temperature causes the surface of the lead plate to partially fuse, and there results an absolute union of the two at the plane of juncture.

My present invention brings about a much more absolute and perfect union of the two and makes the plane of demarkation absolutely imperceptible, so that there is, properly speaking, no point in the united masses where it can be said that the one ends and the other begins.

I will now describe my improvement, and then particularly point out in the claims which follow the essentials which I deem as my invention.

I take any well-known form of two-part mold, A B, used for casting storage-battery plates, said mold having the usual "gate" or "get," G, and fill those portions of the mold which ordinarily are designed to form the lead grid, plate, or support with a pulverized reducing agent, C, the mold having first been heated, so as not to chill the fused salt. In order to locate the reducing agent around the outer edge only of the mold, I first place a removable strip, b, of metal or other material, as shown in Fig. 1, and then fill in the space between it and the walls of the mold. This strip b is then removed. I then place the cover on the mold, as shown in Fig. 2, and fill it with a fused salt of lead. As this fused salt is being poured into the mold, the reducing agent absorbs the acid radicle of the metallic lead more or less perfectly, forming a leaden frame or support around the outer edge and elsewhere, if this reducing agent has been placed in other portions of the mold, while the lead salts, in a more or less pure condition, fill the mold in those portions which are designed to constitute the active faces of the electrode. The action of this reducing agent is based upon the principle that it should have a greater affinity for the acid radicle of the fused salt than has lead itself when fused. As an example, if I use fused lead oxide, I may and do fill those portions of the mold designed to form the grid-plate or support with either carbon in a fine state of division or with niter and carbon, being careful not to pack either too closely. When I use fused chloride of lead, I fill the proper portions of the mold preferably with zinc in a powdered condition, or with tin, or even magnesium, or with an alloy of zinc and magnesium, with which I have obtained very excellent results as regards fineness of casting. It is not an easy matter to determine the best proportions of niter and carbon to be used; but any person skilled in the technical work of casting will readily determine this by trial and judgment, the action being that the niter oxidizes the carbon, producing carbonic oxide, which reduces the lead oxide. I have arrived at excellent results by mixing about five per cent. of niter with the powdered carbon, the niter, of course, having first been carefully dried and pulverized. If carbon alone is used and in bulk, it is apt not to act quickly enough, so that particles of carbon become mixed with the reduced lead; but I desire it to be understood that my invention is broad enough to include within its scope pulverized carbon or any analogous reducing agent which would readily suggest itself to one skilled in the art, but that with the added niter or any obvious equivalent I obtain preferred results. I do not, therefore, limit myself to the specific reducing agent named, my invention being directed, broadly, to the art of producing both the grid, frame, or support of a storage-battery and the active material, or material adapted to become active, at a single operation.

What I claim, and desire to secure by Letters Patent of the United States, is—

1. The described process of producing an electrode for use in a secondary or storage battery, consisting in fusing a metallic substance which possesses electrical storage properties, and then subjecting this fused substance to the action of a properly-disposed reducing agent, which causes the metallic base to assume the position of a grid, frame, or support carrying the residual substance in the nature of active material, or material adapted to become active, substantially as described.

2. The described process of producing an electrode for a secondary or storage battery, consisting in fusing a metallic substance which possesses electrical storage properties, as lead oxide, and then subjecting this fused substance to the action of a reducing agent, as carbon mixed with niter, said reducing agent being placed in a mold in such position that as the fused substance is poured into the mold metallic lead is produced by the reducing agent and the residual substance assumes the position of active material, or material adapted to become active, and held in place by its union with the metallic base, substantially as described.

3. The described process of producing an electrode for use in a secondary or storage battery, which consists in forming the grid, frame, or support and the active material, or material adapted to become active, at one and the same operation, substantially as described.

4. The described process of producing an electrode for use in a secondary or storage battery, consisting in fusing active material, or material adapted to become active, and then subjecting this molten material to the action of a reducing agent, whereby an electrode is formed consisting of a support and active material, or material adapted to become active, so intimately united that there is no line of demarkation between the two, substantially as described.

LEONARD PAGET.

Witnesses:
J. F. QUINN,
C. J. KINTNER.